United States Patent
Hong et al.

(10) Patent No.: US 9,731,268 B2
(45) Date of Patent: Aug. 15, 2017

(54) PLASMA DRY REFORMING APPARATUS

(71) Applicant: KOREA BASIC SCIENCE INSTITUTE, Daejeon (KR)

(72) Inventors: Yong Cheol Hong, Daejeon (KR); Se Min Chun, Daejeon (KR); Seong Yun Cho, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 203 days.

(21) Appl. No.: 14/426,693

(22) PCT Filed: Sep. 9, 2013

(86) PCT No.: PCT/KR2013/008122
§ 371 (c)(1),
(2) Date: Mar. 6, 2015

(87) PCT Pub. No.: WO2014/038907
PCT Pub. Date: Mar. 13, 2014

(65) Prior Publication Data
US 2015/0246337 A1    Sep. 3, 2015

(30) Foreign Application Priority Data
Sep. 7, 2012   (KR) .................. 10-2012-0099222

(51) Int. Cl.
*B01J 19/08*   (2006.01)
*C01B 3/38*   (2006.01)
(Continued)

(52) U.S. Cl.
CPC ........... *B01J 19/088* (2013.01); *B01J 19/126* (2013.01); *C01B 3/342* (2013.01); *C01B 3/38* (2013.01);
(Continued)

(58) Field of Classification Search
None
See application file for complete search history.

(56) References Cited

U.S. PATENT DOCUMENTS 6,753,352 B2    6/2004   Seiki et al.
2006/0127714 A1*   6/2006   Vik .................. H01M 8/04097
429/411
(Continued)

FOREIGN PATENT DOCUMENTS

JP    2003-034503 A    2/2003
KR    10-0240563 B1    1/2000
(Continued)

OTHER PUBLICATIONS

Jasinski et al., "Hydrogen production via methane reforming using various microwave plasma sources", Chem. Listy 102, s1332-s1337 (2008).*

*Primary Examiner* — Kishor Mayekar
(74) *Attorney, Agent, or Firm* — Rabin & Berdo, P.C.

(57) ABSTRACT

The present invention discloses a plasma dry reforming apparatus for producing synthetic gas, main components of which are hydrogen and carbon monoxide, by reforming methane and carbon dioxide injected in plasma, the apparatus comprising: a plasma reformer 100, 200 which produces carbon dioxide plasma by making carbon dioxide supplied therein into plasma, ignites plasma flame by supplying hydrocarbon to the produced dioxide plasma, and produces synthetic gas by supplying methane to the plasma flame.

18 Claims, 11 Drawing Sheets

(51) Int. Cl.
*B01J 19/12* (2006.01)
*C01B 3/34* (2006.01)

(52) U.S. Cl.
CPC *B01J 2219/0809* (2013.01); *B01J 2219/0869* (2013.01); *B01J 2219/0883* (2013.01); *B01J 2219/0892* (2013.01); *B01J 2219/0894* (2013.01); *C01B 2203/0238* (2013.01); *C01B 2203/06* (2013.01); *C01B 2203/0861* (2013.01); *C01B 2203/1035* (2013.01); *C01B 2203/1241* (2013.01)

(56) References Cited

U.S. PATENT DOCUMENTS

| | | | |
|---|---|---|---|
| 2008/0296294 A1* | 12/2008 | Uhm | B01J 19/088 219/688 |
| 2012/0316252 A1* | 12/2012 | Hodoshima | C01B 3/384 518/728 |
| 2013/0252115 A1 | 9/2013 | Hong et al. | |

FOREIGN PATENT DOCUMENTS

| KR | 20060018195 | * | 2/2006 |
| KR | 10-2012-0060273 A | | 6/2012 |
| WO | WO 2012-031338 A1 | | 3/2012 |

* cited by examiner

CO₂ or CO₂ + CH₄

PLASMA DRY REFORMING APPARATUS

TECHNICAL FIELD

The present invention relates to a plasma dry reforming apparatus, and more particularly to a plasma dry reforming apparatus which reforms methane ($CH_4$) and carbon dioxide ($CO_2$) using plasma and generates synthetic gas, main components of which are hydrogen ($H_2$) and carbon monoxide (CO).

BACKGROUND ART

In general, mixture gas of hydrogen and carbon monoxide, i.e. synthetic gas is an important medium in synthesizing an environmentally clean fuel and a chemical raw material such as ammonia, methanol, acetic acid, dimethyl ether (DME), synthetic gasoline and diesel, and various mole rations ($H_2$/CO) of hydrogen and carbon monoxide are needed to synthesize such products. For example, a mole ratio of 2/1 is needed for synthesizing methanol, a mole ratio of 1/1 is needed for synthesizing acetic acid, methyl formate or DME.

The synthetic gas has been produced from coal, petroleum, natural gas, biomass and even from organic waste of an organic compound. The natural gas is increasing in use since it is not only the largest amount of source for producing the synthetic gas at present but also the most inexpensive and environment-friendly.

As a technique of using the natural gas to produce the synthetic gas, there are steam reforming using methane (wet reforming), partial-oxidation using methane, reforming using carbon-dioxide (dry reforming), and a combination of the steam reforming using methane and the reforming using carbon-dioxide. Among them, the steam reforming using methane is a traditional and potential industrial process for producing the synthetic gas.

This method is generally called the wet reforming, and a mole ratio of hydrogen/carbon monoxide has to be 3 or higher in the wet reforming Thus, the wet reforming is proper to synthesize ammonia, but needs extra hydrogen in processes for synthesizing methanol and the like. In a wet process reaction, at least 1 mole of methane is required in producing 1 mole of carbon monoxide.

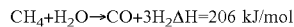

$CH_4+H_2O \rightarrow CO+3H_2 \Delta H=206$ kJ/mol

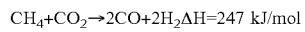

$CH_4+CO_2 \rightarrow 2CO+2H_2 \Delta H=247$ kJ/mol

The $CH_4$—$CO_2$ reforming is a very attractive process for producing the synthetic gas since it uses carbon dioxide and requires less methane.

In comparison with the wet-reforming process and the partial-oxidation processes, the $CH_4$—$CO_2$ reforming method stoichiometrically needs ½ mole of methane to produce 1 mole of carbon monoxide since carbon dioxide is also a carbon source. The $CH_4$—$CO_2$ reforming has a mole ratio of hydrogen/carbon monoxide is 1/1, but it is relatively easy to control the mole ratio of hydrogen/carbon monoxide by adjusting the ratio of methane/carbon dioxide in a feeding process. Therefore, the synthetic gas produced by the $CH_4$—$CO_2$ reforming is not only utilizable in a process of producing acetic acid or methyl formate, but also satisfies the mole ratio of hydrogen/carbon monoxide needed for producing various substances when it is combined with the wet process.

However, the $CH_4$—$CO_2$ reforming process is a high endothermic reaction, and needs special methods for achieving a considerable reaction rate in order to satisfy conditions required in industry. In this context, catalyst and plasma techniques have not been commercialized hitherto even though they are regarded as potential techniques for satisfying the conditions required in the industry.

Referring to FIGS. 1 and 2, in the $CH_4$—$CO_2$ catalyst reforming process, methane and carbon dioxide are injected to a tubiform fixed-bed reactor filled with a catalyst in a catalyst reaction process, and thermal energy needed for the reaction is supplied by combustion energy of natural gas from an outside of a reactor. Although a $CH_4$—$CO_2$ catalyst reforming reactor can be used together with a wet reforming reactor using methane, carbon deposited on a surface of a catalyst and inactivating the catalyst is a major obstacle to change of the $CH_4$—$CO_2$ catalyst reforming process from a laboratory scale to a commercialization scale.

In addition, a plasma $CH_4$—$CO_2$ reforming process was performed by arc discharge under very limited conditions. In comparison with the catalyst reforming process, the plasma $CH_4$—$CO_2$ reforming reaction having an electromagnetic induction chemical reaction and a thermochemical reaction shows a high conversion rate and selectivity and has no problem of the carbon deposition. Accordingly, despite energy used for generating plasma, the plasma $CH_4$—$CO_2$ reforming process has been continuously researched and attracted attention over the past decade.

DISCLOSURE

Technical Problem

The present invention is conceived to solve the foregoing problems, and an aspect of the present invention is to provide a plasma dry reforming apparatus, which reforms methane ($CH_4$) and carbon dioxide ($CO_2$) injected in plasma and generates synthetic gas, main components of which are hydrogen ($H_2$) and carbon monoxide (CO), thereby decreasing usage of methane and largely increasing usage of carbon dioxide Another aspect of the present invention is to provide a plasma dry reforming apparatus, which is combined with a plasma wet process by injecting steam ($H_2O$) to a dry reforming process using plasma, and controls a mole ratio of hydrogen/carbon monoxide while decreasing usage of electric energy for plasma, thereby producing various chemical substances.

Technical Solution

In accordance with one aspect of the present invention, there is provided a plasma dry reforming apparatus for producing synthetic gas, main components of which are hydrogen ($H_2$) and carbon monoxide (CO), by reforming methane ($CH_4$) and carbon dioxide ($CO_2$) using plasma, the apparatus comprising: a plasma reformer 100, 200 which produces carbon dioxide plasma by making carbon dioxide supplied therein into plasma, ignites plasma flame by supplying hydrocarbon to the produced dioxide plasma, and produces synthetic gas by supplying methane to the plasma flame.

The plasma reformer 100 may includes: a body 110 comprising a reaction space 111 which is internally formed for making plasma, a methane supplying tube 112 which is provided in a lower side and communicates with the reaction space 111 and through which methane is injected into the reaction space 111, and a carbon dioxide supplying tube 113 which is provided in a lateral circumference and communicates with the reaction space 111 and through which carbon dioxide is injected into the reaction space 111; a discharge tube 120 stably mounted inside the reaction space 111 of the body 110 and receiving a microwave to make plasma in the reaction space 111; a wave guide 130 fastened to the body 110, connected to the discharge tube 120, and applying a received microwave having a preset frequency to the discharge tube 120; and a hydrocarbon supplying tube 140 injecting hydrocarbon into the reaction space 111.

Advantageous Effects

According to embodiments of the present invention, the plasma dry reforming apparatus has the following effects.

First, methane and carbon dioxide using plasma are reformed to produce the synthetic gas, main components of which are hydrogen and carbon monoxide, thereby decreasing use of methane but largely increasing use of carbon dioxide. Thus, carbon dioxide causing global warming can be reduced since it is used as a raw material.

Second, the dry reforming process using plasma is combined with the plasma wet process by employing steam ($H_2O$), so that the mole ratio of hydrogen/carbon monoxide can be controlled to produce various chemical substances while reducing consumption of electric energy.

Third, the synthetic gas produced from the plasma methane-carbon monoxide reforming reaction may be selectively provided to the DME production process for producing dimethyl ether, the synthetic gas separation process for separating hydrogen and carbon monoxide of the synthetic gas from each other, or the power generation process for generating electricity.

Fourth, the carbon dioxide supplying tube and the hydrocarbon supplying tube are tangentially formed on the circumference of the discharge tube or body, so that carbon dioxide and hydrocarbon supplied from the outside can be guided by the inner wall of the discharge tube or body to vortically flow and introduced into the reaction space, thereby being mixed and reacted with plasma. Thus, carbon dioxide, methane, plasma and hydrocarbon can be uniformly mixed in the reaction space and stably undergo chemical reaction. Further, the inner walls of the discharge tube and the body are protected from plasma flame.

Fifth, the carbon dioxide supplying tube is inclined upward at a predetermined angle to a horizontal center line L of the body so that carbon dioxide can be injected into the reaction space while flowing upwardly and vertically, and the hydrocarbon supplying tube is inclined downward at a predetermined angle to a horizontal center line L of the discharge tube or the body so that carbon dioxide can be injected into the reaction space while flowing downwardly and vortically. Thus, the ascending flow of carbon dioxide injected through the carbon dioxide supplying tube acts as conventional vortex flow with regard to a direction of discharging the reformed synthetic gas, and the descending flow of hydrocarbon injected through the hydrocarbon supplying tube acts as reverse vortex flow with regard to the direction of discharging the reformed synthetic gas. Interaction between such respective gas flows causes plasma flame and carbon dioxide, methane and hydrocarbon to be reacted with one another within the reaction space and thus reforming time is increased, thereby maximizing a reforming efficiency.

BEST MODE

Figure 1:
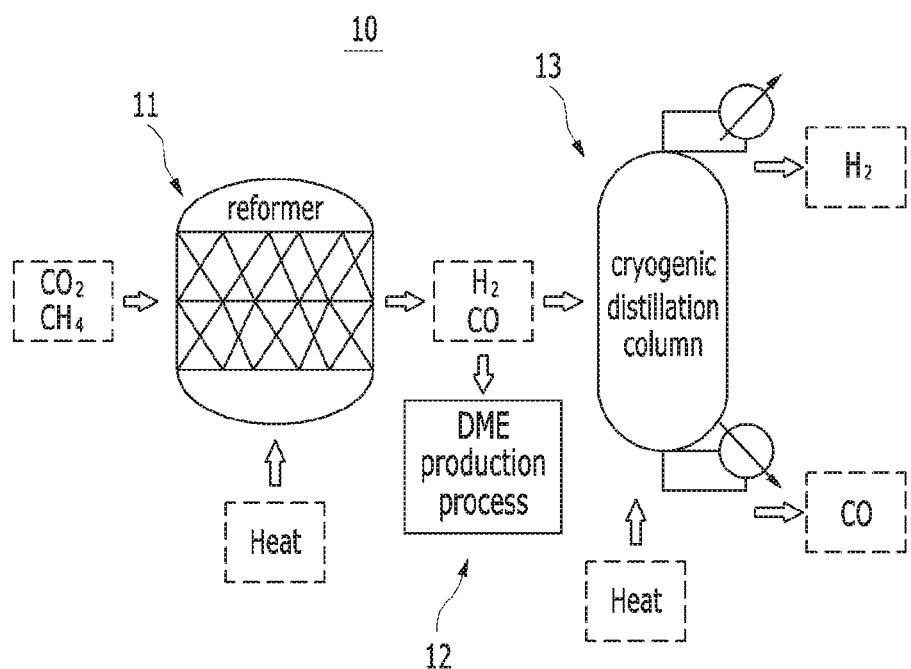
FIG. 1 and FIG. 2 are schematic views showing a conventional reforming apparatus using a catalyst reformer.
Figure 2:
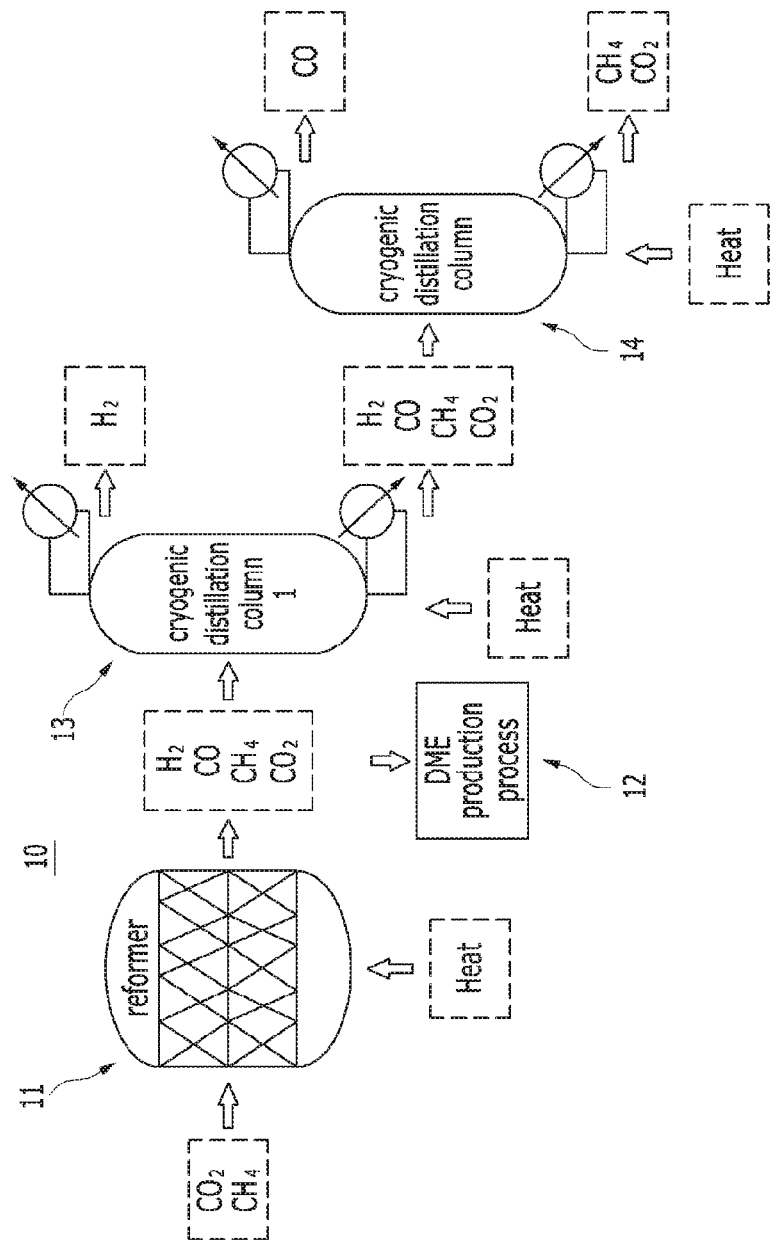

Hereinafter, exemplary embodiments according to the present invention will be described with reference to accompanying drawings. Also, terms and words used in the following description and claims have to be interpreted by not the limited meaning of the typical or dictionary definition, but the meaning and concept corresponding to the technical idea of the present invention on the assumption that the inventor can properly define the concept of the terms in order to describe his/her own invention in the best way.

Accordingly, the disclosure in the specification and the configurations shown in the drawings are just preferred embodiments of the present invention and do not cover all the technical idea of the present invention. Thus, it should be appreciated that such embodiments may be replaced by various equivalents and modifications at a point of time when the present application is filed.

Figure 3:
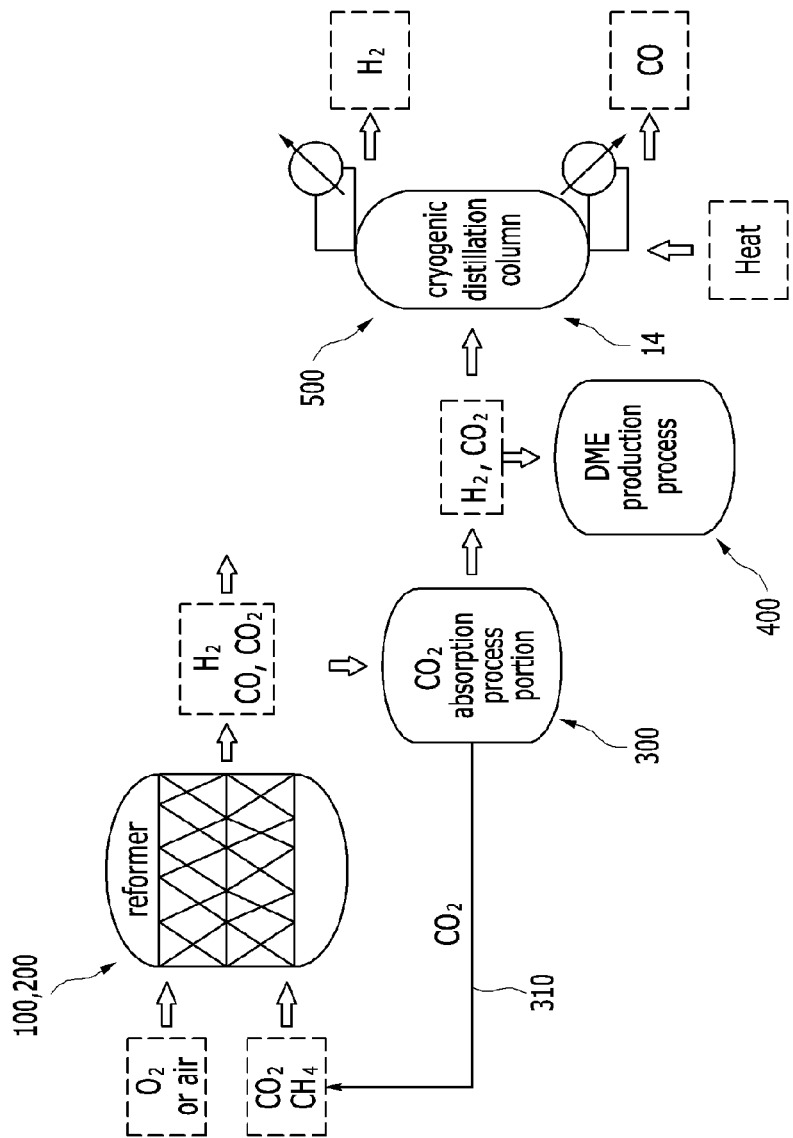
FIG. 3 is a schematic view showing a plasma dry reforming apparatus according to an embodiment of the present invention.

According to an embodiment of the present invention, a plasma dry reforming apparatus is a reforming apparatus that can be selectively applied to a dimethyl ether (DME) production process in which synthetic gas, main components of which are hydrogen ($H_2$) and carbon monoxide (CO), is generated by reforming methane ($CH_4$) and carbon dioxide ($CO_2$) using plasma, and dimethyl ether is produced from the generated synthetic gas; a synthetic gas separation process in which hydrogen and carbon monoxide of the synthetic gas are separated from each other; and a power generation process in which electricity is generated. As shown in FIG. 3, the plasma dry reforming apparatus includes a plasma reformer 100, 200, a $CO_2$ absorption process portion 300, a DME production process portion 400 and a power generation portion 600.

First, the plasma reformer 100, 200 makes carbon dioxide into plasma to produce carbon dioxide plasma, supplies hydrocarbon to the produced carbon dioxide plasma to ignite plasma flame, and supplies methane to the plasma flame to produce the synthetic gas. In accordance with methods of making the plasma, the plasma reformer 100, 200 may be classified into a microwave torch plasma dry reformer 100 and an arc torch plasma dry reformer 200.

Figure 4:
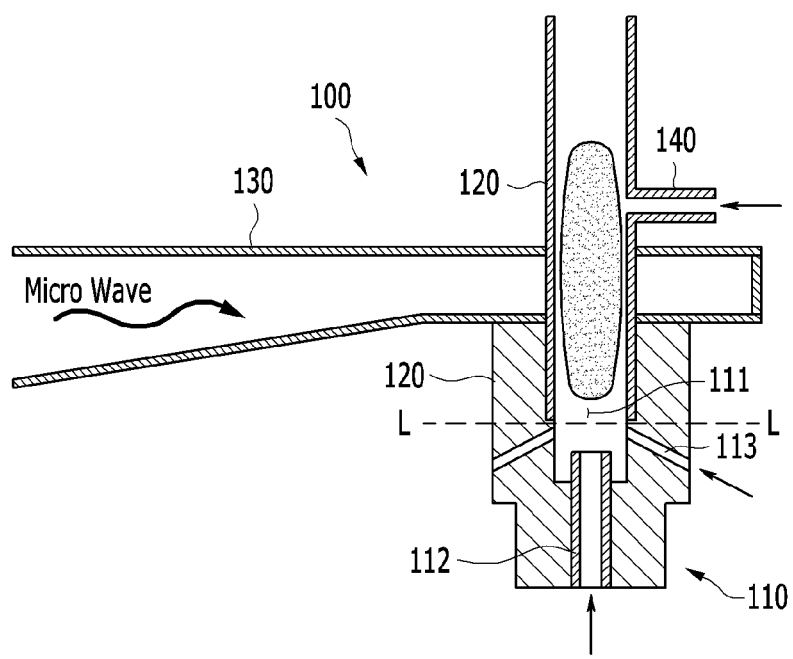
FIG. 4 is a cross-section view showing a microwave torch plasma dry reformer according to an embodiment of the present invention.

The microwave torch plasma dry reformer 100 includes a body 110, a discharge tube 120, a wave guide 130 and a hydrocarbon supplying tube 140 as shown in FIG. 4.

As an element for forming a base of the plasma reformer 100, the body 110 includes a reaction space 111 internally formed for making plasma; a methane supplying tube 112 which is provided in a lower side and communicates with the reaction space 111 and through which methane is injected into the reaction space 111; and a carbon dioxide supplying tube 113 which is provided in a lateral circumference and communicates with the reaction space 111 and through which carbon dioxide is injected into the reaction space 111.

Figure 5:
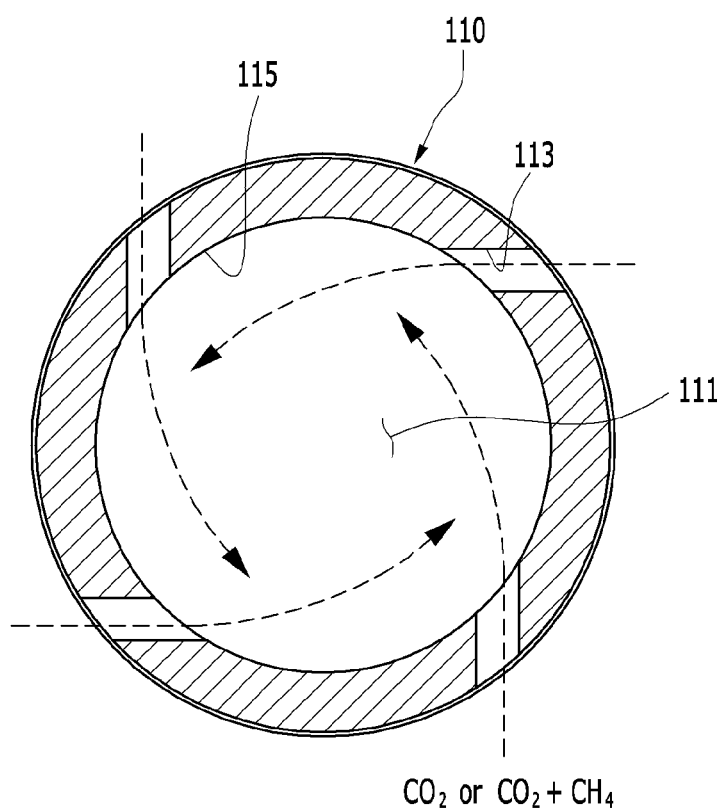
FIG. 5 is a cross-section view showing that a carbon dioxide supplying tube is tangentially formed on a circumferential surface of a body of the microwave torch plasma dry reformer according to an embodiment of the present invention.

As shown in FIG. 5, the plurality of carbon dioxide supplying tubes 113 are equidistantly spaced apart from each other along the circumference of the body 110 and tangentially formed on the circumference of the body 110, so that carbon dioxide supplied from the outside can be guided by an inner wall 115 of the body 110 to vortically flow and introduced into the reaction space 111, thereby allowing plasma and methane to be mixed and reacted with each other.

As carbon dioxide supplied from the outside is guided by an inner wall 115 of the body 110 to vortically flow and introduced into the reaction space 111 as shown in FIG. 5 to thereby allow plasma and methane to be mixed and reacted with each other, it is possible to not only make carbon dioxide, methane, plasma and hydrocarbon be uniformly mixed and stably chemically reacted with one another in the reaction space 111, but also protect the discharge tube 120 and the inner wall 115 of the body 110 from high-temperature plasma flame.

Further, as shown in FIG. 4, the carbon dioxide supplying tube 113 is inclined upward at a predetermined angle to a horizontal center line L of the body 110 so that carbon dioxide can be injected into the reaction space 111 while flowing upwardly and vortically.

Thus, the ascending flow of carbon dioxide injected through the carbon dioxide supplying tube 113 acts as conventional vortex flow with regard to a direction of discharging the reformed synthetic gas, so that the flow of carbon dioxide injected to a lower side of plasma can become stronger, thereby more smoothly mixing plasma and carbon dioxide.

In addition, the carbon dioxide supplying tube 113 allows mixture gas of carbon dioxide and methane to be injected into the reaction space 111.

Further, the carbon dioxide supplying tube 113 allows mixture of carbon dioxide and air, oxygen, or mixture of carbon dioxide and steam to be injected into the reaction space 111. Separately from the carbon dioxide supplying tube 113, a supplying tube (not shown) may be formed around the body 110 or the discharge tube 120 and inject air, oxygen or steam into the reaction space 111.

Thus, carbon dioxide is mixed with air or oxygen, injected into the carbon dioxide supplying tube 113, and supplied to the plasma formed inside the reaction space 111, thereby providing a reforming temperature of a reactor through a partial-oxidation or combustion process of methane (keeping an inner temperature of the reactor). Further, steam ($H_2O$) (where, a ratio of $H_2O/CO_2>1$) is injected sto thereby increase production of carbon monoxide and hydrogen through the partial-oxidation process of methane. By controlling the injection of the steam, the ratio of $H_2O/CO_2$ is controllable.

The discharge tube 120 is an element stably mounted inside the reaction space 111 of the body 110 and receives a microwave to generate plasma in the reaction space 111. The discharge tube 120 has a cylindrical shape and is vertically arranged concentrically with the reaction space 111.

The wave guide 130 is fastened to the body 110 and connected to the discharge tube 120, and applies a received microwave having a preset frequency to the discharge tube 120. Although it is not shown in FIG. 4, a microwave supplying means is connected to the preceding of the wave guide 130. The microwave supplying means includes a high-frequency oscillator which generates the microwave by receiving driving power from the outside; a circulator which outputs the microwave generated from the high-frequency oscillator and at the same time protects the high-frequency oscillator by dissipating microwave energy reflected due to impedance mismatching; and a tuner which induces impedance matching by adjusting the strength of an incident wave and a reflected wave of the microwave output from the circulator so that an electric field induced by the microwave can be maximized within the discharge tube 120.

The microwave supplying means for supplying the microwave to the wave guide 130 has been publicly known and used in the technical field to which the present invention pertains, and therefore detailed descriptions thereof will be omitted.

The hydrocarbon supplying tube 140 is an element for injecting hydrocarbon into the reaction space 111 so that hydrocarbon can be supplied to plasma produced in the reaction space 111. FIG. 4 illustrates that the hydrocarbon supplying tube 140 is arranged at one side on the circumference of the discharge tube 120, but not limited thereto. If a separate cover is provided for covering one side on the circumference of the body 110 or an upper circumference of the discharge tube 120, the hydrocarbon supplying tube may be arranged one side on the circumference of the cover and inject hydrocarbon toward the plasma produced in the reaction space 111.

Like the foregoing carbon dioxide supplying tubes 113, the plurality of hydrocarbon supplying tubes 140 may be equidistantly spaced apart from each other along the circumference of the discharge tube 120 or the body 110 and tangentially formed on the circumferential surface of the discharge tube 120 or the body 110, so that hydrocarbon supplied from the outside can be guided to flow vortically by the discharge tube 120 or the inner wall 115 of the body 110 and mixed and reacted with carbon dioxide, plasma and methane while being introduced into the reaction space 111.

Thus, that hydrocarbon supplied from the outside can be guided to flow vortically by the discharge tube 120 or the inner wall 115 of the body 110 and mixed and reacted with plasma while being introduced into the reaction space 111, so that carbon dioxide and methane plasma can be more uniformly mixed and chemically stably reacted with hydrocarbon within the reaction space 111, and the vortex flow can become stronger within the reaction space 111.

Although it is not shown, the hydrocarbon supplying tube 140 is inclined downward at a predetermined angle to a horizontal center line L of the discharge tube 120 or the body 110 so that carbon dioxide can be injected into the reaction space 111 while flowing downwardly and vortically.

Thus, the ascending flow of carbon dioxide injected through the carbon dioxide supplying tube 113 acts as conventional vortex flow with regard to a direction of discharging the reformed synthetic gas, and the descending flow of hydrocarbon injected through the hydrocarbon supplying tube 140 acts as reverse vortex flow with regard to the direction of discharging the reformed synthetic gas. Interaction between such respective gas flows causes plasma flame and carbon dioxide, methane and hydrocarbon to be reacted with one another within the reaction space 111 and thus reforming time is increased, thereby maximizing a reforming efficiency.

Hydrocarbon is an organic compound that mainly contains carbon and hydrogen, and refers to a gaseous, liquid and solid hydrocarbon compounds. Here, hydrocarbon may include one of methane, ethane, propane, ethylene and butane of a gas state; DME, gasoline, diesel, kerosene, bunker-C oil, and refined waste oil of a liquid state; or coal and biomass of a solid state.

If methane is not used as hydrocarbon, the hydrocarbon supplying tube 140 may inject a mixture of hydrocarbon and methane to produce the plasma inside the reaction space 111.

Therefore, if a solid or liquid hydrocarbon compound is used as hydrocarbon, the plasma produced in the reaction space 111 is not maintained or is unstably maintained. Accordingly, methane is mixed with hydrocarbon and then injected to the plasma through the hydrocarbon supplying tube 140.

Figure 6:
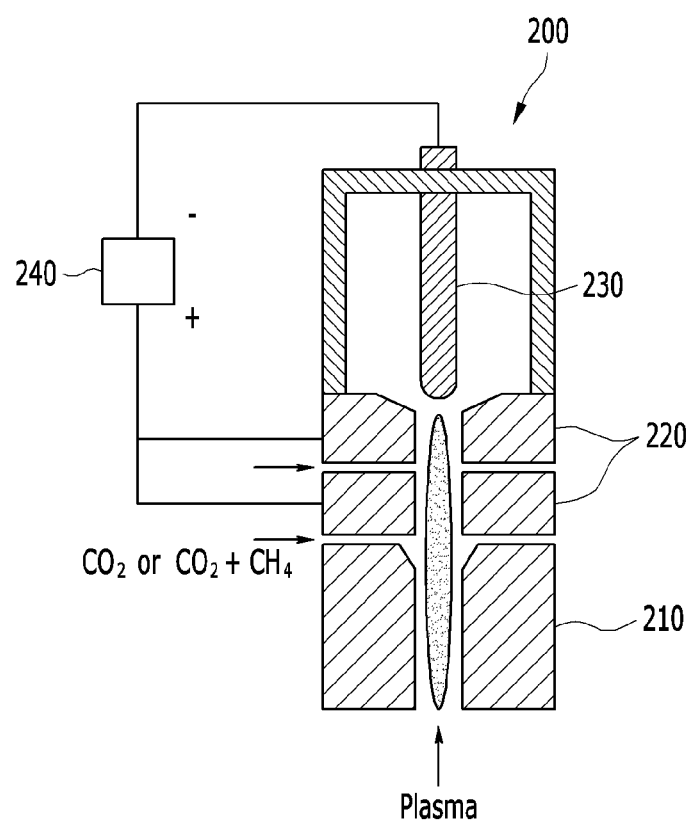
FIG. 6 is a cross-section view showing an arc torch plasma dry reformer according to an embodiment of the present invention.

By the way, the arc torch plasma dry reformer 200 includes a reactor portion 210, a cathode portion 230 and a power supply 240 as shown in FIG. 6.

The reactor portion 210 is internally formed with a reaction space 211 having a hollow shape and provides a space in which plasma will be produced. An anode portion 220 is placed above the reactor portion 210, formed with a second reaction space 221 having a hollow shape and communicating with the first reaction space 211, and receives positive charges from the power supply 240. As shown therein, the anode portions 220 may be successively arranged in the form of a plurality of layers above the reactor portion 210.

The cathode portion 230 is placed above and adjacent to the anode portion 220 and receives negative charges from the power supply 240. The power supply 240 applies a high voltage between the anode portion 220 and the cathode portion 230.

When the power supply 240 applies a high voltage between the anode portion 220 and the cathode portion 230, an arc is generated by a potential difference between the anode portion 220 and the cathode portion 230, thereby producing plasma. Then, carbon dioxide, or mixture gas of carbon dioxide and methane, which is injected in plasma, are reformed to thereby produce the synthetic gas.

Carbon dioxide, or the mixture gas of carbon dioxide and methane may be injected into the first reaction space 211 and the second reaction space 221 via a gap between the reactor portion 210 and the anode portion 220 and gaps between the plurality of anode portions 220.

In general, plasma depends on an energy density level, temperature and density. Thus, plasma used in the $CH_4$—$CO_2$ reforming is classified into thermodynamic non-equilibrium plasma (so called, cold plasma (room temperature plasma): kinetic energy of electrons is much greater than that of heavy particles (ions, neutral particles)), and thermodynamic equilibrium plasma.

In cold plasma, most of chemical reaction is caused by electrons accelerated in an electric field, and energy is transferred to neutral particles through electron collision dissociation, excitation and ionization processes.

On the other hand, thermodynamic equilibrium plasma is called hot plasma, in which the temperature of heavy particles is almost the same as that of electrons. In hot plasma, many collisions between electrons and heavy particles cause density of electrons to be higher than that of cold plasma. Most of electrons accelerated in the electric field heats heavy particles, thereby maintaining thermodynamic equilibrium between electrons and heavy particles. For this reason, a chemical reaction of hot plasma is characterized in that thermo chemical reactions of electrons and thermo chemical reactions of heavy particles are simultaneously performed.

Figure 7:
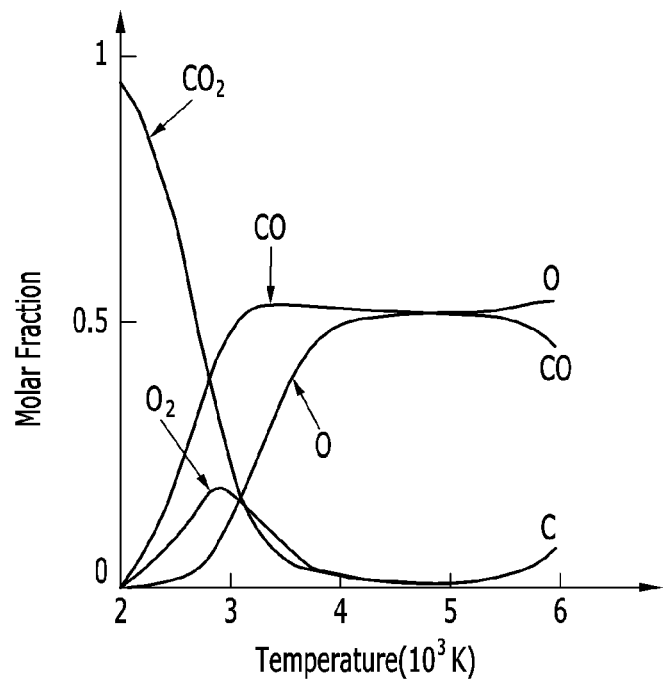
FIG. 7 is a graph showing change in molar fraction of carbon dioxide and a breakdown product in accordance with temperatures in thermal plasma.

As shown in FIG. 7, carbon dioxide is almost perfectly dissociated under 4500K at p=0.16 atm. Further, it is expected that carbon dioxide is perfectly dissociated under 7000K at p=1 atm. In this regard, microwave torch plasma (core temperature of 6500K) and arc torch (core temperature of 11000K) have advantages.

For example, if carbon dioxide is dissociated into carbon monoxide and oxygen, i.e. if a reaction involves $CO_2 \rightarrow CO+O$, changes in enthalpy and entropy are $\Delta H=530$ kJ/mole and $\Delta S=147$ J/mole/degree. Gibbs free energy is calculated by $G=\Delta H-T\Delta S$, and the temperature at which this reaction spontaneously occurs is calculated by $T=\Delta H/\Delta S$. In this case, T is 3600K. Thus, it will be appreciated that most of carbon dioxide is dissociated under a gas temperature of 7000K.

Figure 8:
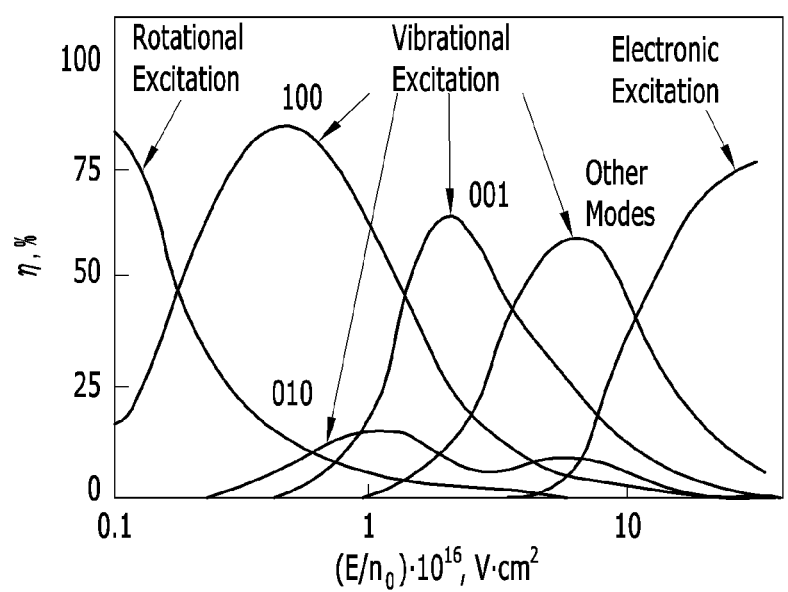
FIG. 8 is a graph showing fraction of specific heat carbon dioxide discharge energy which is transferred from plasma electrons to carbon dioxide molecules via various excitation channels.

In plasma, the most efficient excitation channel for the carbon dioxide dissociation is vibrational excitation. As shown in FIG. 8, most of discharge energy from plasma electrons is transferred to vibrate carbon dioxide. At this time, this energy approximates to 1 eV. As described above, this is an energy level of microwave torch plasma at 1 atm. and the arc torch.

In FIG. 8, the vibrational excitation of carbon dioxide due to the electron collision has the maximum speed constant value of about kev=1~3×10$^{-8}$ cm$^3$/s. energy loss of vibrational excitation based on vibrational-transitional(VT) relaxation is related to a symmetric vibration mode, and this is relatively slow. In result, plasma having a sufficient degree of plasma ionization of ne/n0≥10$^{-6}$ makes the $CO_2$ ground electronic state ($^1\Sigma^+$) vibrational levels sufficiently reach overeqilibrium population (refer to FIG. 9). Most of plasma electrons excites low vibrational levels of ground electronic state $CO_2$ $^1\Sigma^+$(refer to FIG. 9). Population having very highly excited levels is caused by vibrational-vibrational(V-V) relaxation.

Figure 9:
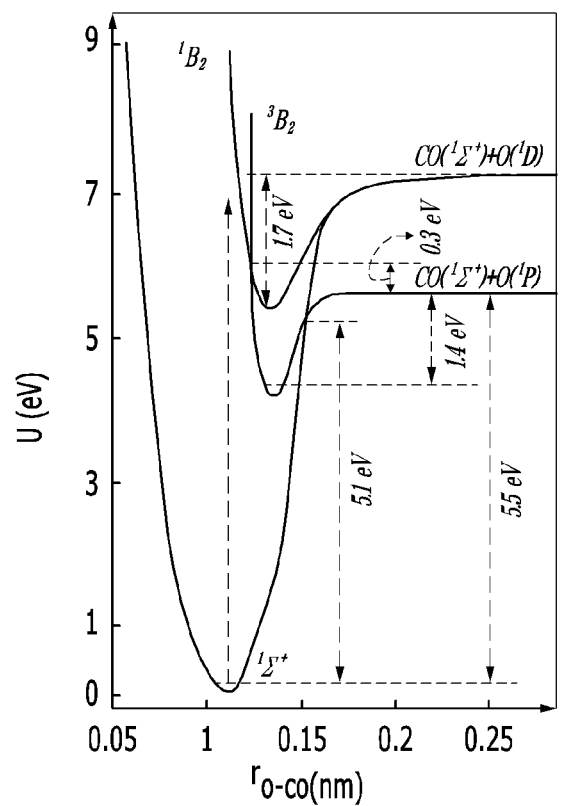
FIG. 9 is a graph showing of low electronic terms of carbon dioxide.

If $CO_2$ is very highly vibrational-excited exceeding a dissociation threshold value, $CO_2 \rightarrow CO+O$ ($\Delta H=5.5$ eV/mol). In FIG. 9, straightforward adiabatic dissociation of vibrationally excited carbon dioxide produces excited oxygen and requires energy of 7 eV or higher [$CO_2^*(^1\Sigma^+) \rightarrow CO(^1\Sigma^+)+O(^1D)$].

Non-adiabatic transition $^1\Sigma^+ \rightarrow 3B2$ provides more efficient dissociation process by step-by-step vibrational excitation. $CO_2^*(^1\Sigma^+) \rightarrow CO_2^*(^3B_2) \rightarrow CO(^1\Sigma^+)+O(^3P)$, Ea=5.5 eV/mol]. As shown in FIG. 9, the foregoing process produces oxygen [$O(^3P)$] of ground state and requires energy of 5.5 eV as bonding energy of OC=O. Together with vibrationally excited carbon dioxide, such produced oxygen takes part in the second reaction. $O+CO_2^* \rightarrow CO+O_2$, $\Delta H=5.5$ eV/mol, Ea=0.5. 1 eV/mol This reaction secondarily produces CO when a vibrational temperature Tv is not too low (Tv≥0.1 eV).

Figure 11:
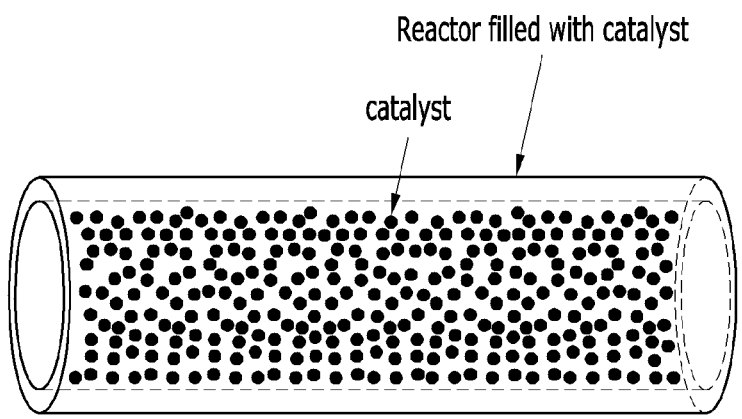
FIG. 11 is a schematic view showing that an inner wall or inside of the plasma reformer is filled with a photocatalyst according to an embodiment of the present invention.

In the plasma dry reforming apparatus 1 according to an embodiment of the present invention, the photocatalyst is filled in the inner wall or inside of the plasma reformer 100, 200 to make a catalytic reaction space, thereby increasing the reforming efficiency after the plasma reforming FIG. 11 schematically shows that the inner wall or inside of the plasma reformer 100, 200 is filled with the photocatalyst according to an embodiment of the present invention.

Figure 10:
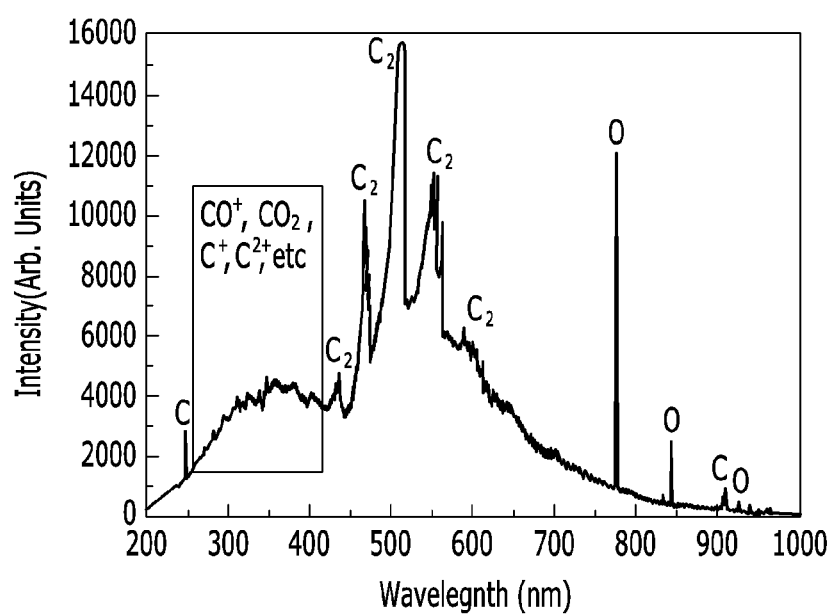
FIG. 10 is a graph showing an optical emission spectrum of pure $CO_2$ plasma according to an embodiment of the present invention.

In general, ZnO, $TiO_2$, etc. is excited when receiving energy of 3.2 eV and thus serves as a photocatalyst. As shown in FIG. 8, carbon dioxide is excited at energy of 0.5 ev or higher in most of vibrational excitation modes and emits light of corresponding energy when returning to a ground state. For this reason, the photocatalyst is filled in the inner wall or inside of the plasma reformer 100, 200 and improves the reforming efficiency. As shown in FIG. 10, pure carbon dioxide plasma excites the photocatalyst as described above while emitting light of 300-400 nm (approximately ~3.2 eV), thereby enhancing the reforming effect.

The catalysts to be filled in the reactor are as follows.

TABLE 1

| Catalysts | component |
|---|---|
| Mn-Based Oxide Catalysts | $Mn-O/SiO_2$ |
| Cr-Based Oxide Catalysts | $Cr_2O_3/SiO_2Cr_2O_3/ZrO_2Cr_2O_3/Al_2O_3Cr_2O_3/TiO_2$ |
| Ga-Based Oxide Catalysts | $Ga_2O_3/TiO_2$ |
| Ce-Based Oxide Catalysts | $CeO_2\ CaO-CeO_2$ |
| Other Catalysts | $Ni/Al_2O_3Ni/SiO_2Ni/MgORu/MgORu/Eu_2O_2Ru/Al_2O_3Ru/Al_2O_3Ru/MgOPt/MgOPt/ZrO_2Pd/MgOCu/SiO_2$ |

Figure 12:
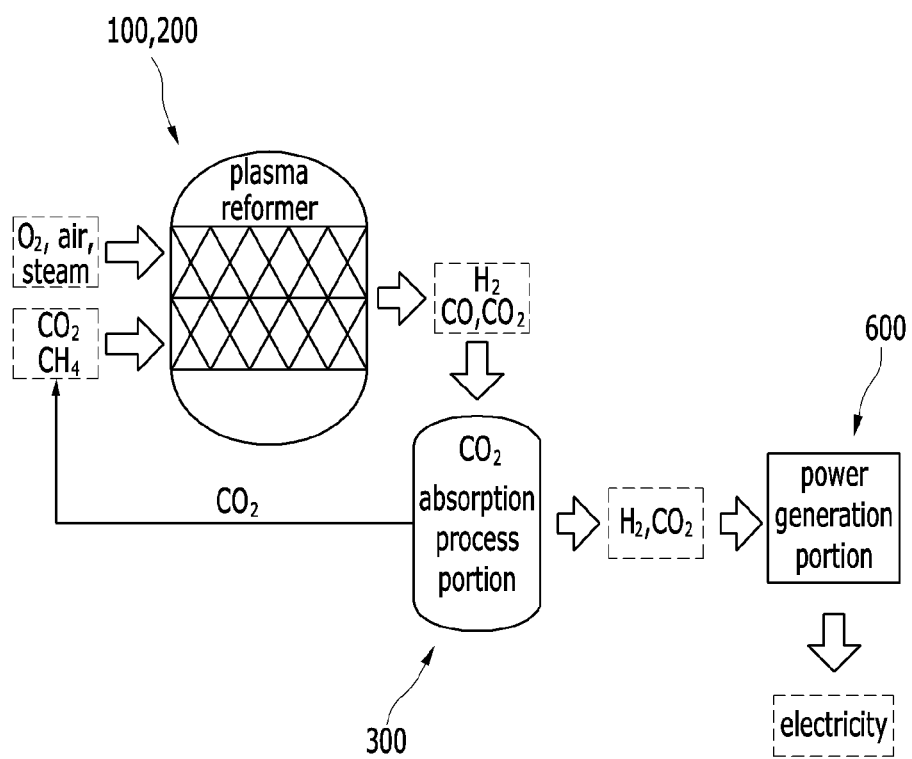
FIG. 12 is a schematic view showing another structure of the plasma dry reforming apparatus according to an embodiment of the present invention.

As shown in FIGS. 3 and 12, the $CO_2$ absorption process portion 300 adsorbs carbon dioxide contained in the synthetic gas produced in the plasma reformer 100, 200, so that only hydrogen and carbon monoxide can be supplied to a DME production process portion 400, a cryogenic distillation column 500 and a power generation portion 600 provided in the following of the $CO_2$ absorption process portion 300. The $CO_2$ absorption process portion 300 is arranged in the following of the plasma reformer 100, 200, receives the synthetic gas produced by the plasma reformer 100, 200 through a synthetic gas supplying line connected to the plasma reformer 100, 200, and absorbs carbon dioxide contained in the synthetic gas.

The $CO_2$ absorption process portion 300 may use alkanolamine adsorber (MEA or MDEA) to absorb carbon dioxide from the produced synthetic gas. Alkanolamine has at least one or more hydroxyl groups (—OH) and amine groups ($NH_2$-), in which the hydroxyl group generally decreases steam pressure to increase water solubility, but the amine group generally increases basicity of the absorber to absorb acidic gas.

Alkanolamine is classified into first, second and third grade alkanolamines in accordance with the number of carbons having the hydroxyl group (OH—, alcohol) boned to the amine group. In a carbon dioxide absorption process using alkanolamine, aqueous solution is directly reacted with carbon dioxide, or alkanolamine is boned with carbon dioxide, which is acid in the aqueous solution, by a chemical reaction of producing nonvolatile ion components by an acid-base neutralization reaction.

As an element for using the produced synthetic gas to synthesize dimethyl ether, the DME production process portion 400 is arranged in the following of the $CO_2$ absorption process portion 300 and receives the synthetic gas, carbon dioxide of which is removed by the $CO_2$ absorption process portion 300, through the synthetic gas supplying line connected to the $CO_2$ absorption process portion 300.

The DME production process portion 400 synthesizes dimethyl ether from the synthetic gas containing hydrogen and carbon monoxide through a catalytic reaction. Such a method of synthesizing dimethyl ether is classified into a two-step indirect synthesizing reaction where methanol is produced from the synthetic gas and then dehydrated to produce dimetyl ether, and a one-step direct synthesizing reaction where dimethyl ether is directly synthesized from the synthetic gas. The following [Table 2] shows reaction formulas for synthesizing dimethyl ether.

TABLE 2

| Chemical reaction | | Heat of reaction (kcal/mol) | Free energy, ΔG600K (kJ/mol-DME) |
|---|---|---|---|
| (1) $3CO + 3H_2 \rightarrow CH_3O\ CH_3 + CO_2$ | From synthesis gas | +58.8 | +63.6 |
| (2) $2CO + 4H_2 \rightarrow CH_3O\ CH_3 + H_2O$ | Combination of (3) and (4) | +49.0 | +80.1 |
| (3) $2CO + 4H_2 \rightarrow 2\ CH_3OH$ | Methanol synthesis | +43.4 | +90.8 |
| (4) $2\ CH_3OH \rightarrow CH_3\ CH_3 + H_2O$ | Dehydration reaction | +5.6 | −10.7 |
| (5) $CO + H_2O \rightarrow CO_2 + H_2CO$ | shift conversion | +9.8 | −16.5 |
| (6) $2\ CH_4 + CO_2 + O2 \rightarrow 3CO + 3\ H_2 + H_2O$ | Methane reforming reaction | — | — |

As an element for dissociating hydrogen and carbon monoxide of the produced synthetic gas from each other and allowing hydrogen and carbon monoxide to be separately used in accordance with usage, the cryogenic distillation column 500 is arranged in the following of the $CO_2$ absorption process portion 300 and receives the synthetic gas, from which carbon dioxide is removed by the $CO_2$ absorption process portion 300, through the synthetic gas supplying line connected to the $CO_2$ absorption process portion 300.

As one of methods for separating a pure material from a mixture, the distillation method is based on difference in volatility (i.e., changeability into gas) among components. When the mixture is heated, a component having higher volatility is precedently evaporated, and the evaporated gas is condensed into liquid while passing through a condenser. That is, the mixture of carbon monoxide and hydrogen is separated based on the difference in volatility. Carbon monoxide having relatively low volatility is collected as residues, and hydrogen having relatively high volatility is evaporated and collected in each layer.

As an element for using the produced synthetic gas to generate electricity, the power generation portion 600 is, as shown in FIG. 12, arranged in the following of the $CO_2$ absorption process portion 300, and receives the synthetic gas, from which carbon dioxide is removed by the $CO_2$ absorption process portion 300, from the $CO_2$ absorption process portion 300 through the synthetic gas supplying line.

The power generation portion 600 may include a gas engine, a gas turbine, a steam turbine, a fuel cell or the like various electricity generators in accordance with methods of generating electricity using carbon monoxide or hydrogen. In each electricity generator, a structure of using carbon monoxide or hydrogen to generate electricity has been widespread in the technical field to which the present invention pertains, and may have various shapes and functions. Thus, detailed descriptions will be omitted.

According to an embodiment of the present invention, the plasma dry reforming apparatus essentially includes the plasma reformer 100, 200 and the $CO_2$ absorption process portion 300 and may optionally include the DME production process portion 400 and the cryogenic distillation column 500 as shown in FIG. 3, or the DME production process portion 400 and power generation portion 600, or only one among the DME production process portion 400, the cryogenic distillation column 500 and power generation portion 600

That is, the synthetic gas produced from the plasma methane-carbon monoxide reforming reaction may be selectively provided to the DME production process for producing dimethyl ether, the synthetic gas separation process for separating hydrogen and carbon monoxide of the synthetic gas from each other, or the power generation process for generating electricity.

Further, absorbed carbon dioxide may be fed back to a carbon dioxide supplying route of the plasma reformer 100, 200 through a feedback line 310 connected to the plasma reformer 100, 200.

According to an embodiment of the present invention, there is provided a plasma dry reforming apparatus, in which methane and carbon dioxide injected in plasma are reformed to produce the synthetic gas, main components of which are hydrogen and carbon monoxide, thereby decreasing use of methane but increasing use of carbon dioxide. Thus, carbon dioxide causing global warming can be reduced since it is used as a raw material.

Further, there is provided a plasma dry reforming apparatus, in which the dry reforming process using plasma is combined with the plasma wet process by employing steam ($H_2O$) plasma, so that the mole ratio of hydrogen/carbon monoxide can be controlled to produce various chemical substances while reducing consumption of electric energy.

Although some embodiments have been described herein with reference to the accompanying drawings, it will be understood by those skilled in the art that these embodiments are provided for illustration only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A plasma dry reforming apparatus for producing synthetic gas, main components of which are hydrogen ($H_2$) and carbon monoxide (CO), by reforming methane ($CH_4$) and carbon dioxide ($CO_2$) injected in plasma, the apparatus comprising:
a plasma reformer configured to produce carbon dioxide plasma from carbon dioxide supplied therein, ignite plasma flame by supplying hydrocarbon to the produced carbon dioxide plasma, and produce synthetic gas by supplying methane to the plasma flame,
wherein the plasma reformer is a microwave torch plasma dry reformer that comprises:
a body including:
a reaction space within which the carbon dioxide plasma is produced,
a methane supplying tube, provided in a lower side of the body, which communicates with the reaction space and through which methane is injected into the reaction space; and
a carbon dioxide supplying tube, provided in a lateral circumference of the body, which communicates with the reaction space and through which carbon dioxide is injected into the reaction space;
a discharge tube stably mounted inside the reaction space of the body adapted to receive a microwave to make the carbon dioxide plasma in the reaction space;
a wave guide fastened to the body, connected to the discharge tube, adapted to apply the received microwave having a preset frequency to the discharge tube; and
a hydrocarbon supplying tube adapted to inject hydrocarbon into the reaction space,
wherein an inner wall or inside of the plasma reformer is formed with a catalytic reaction space filled with a photocatalyst to be excited by the carbon dioxide plasma.

2. The plasma dry reforming apparatus according to claim 1, wherein a plurality of carbon dioxide supplying tubes are equidistantly spaced apart from each other along the lateral circumference of the body.

3. The plasma dry reforming apparatus according to claim 2, wherein the carbon dioxide supplying tube is tangentially formed on the lateral circumference of the body, so that the carbon dioxide supplied from an outside can be guided by an inner wall of the body to vortically flow and introduced into the reaction space so that the carbon dioxide plasma and methane can be mixed and reacted with each other.

4. The plasma dry reforming apparatus according to claim 3, wherein the carbon dioxide supplying tube is inclined upward at a predetermined angle to a horizontal center line of the body so that the carbon dioxide can be injected into the reaction space while flowing upwardly and vortically.

5. The plasma dry reforming apparatus according to claim 1, wherein a plurality of hydrocarbon supplying tubes are equidistantly spaced apart from each other along a circumference of the discharge tube or the lateral circumference of the body.

6. The plasma dry reforming apparatus according to claim 5, wherein the hydrocarbon supplying tube is tangentially formed on the circumferential surface of the discharge tube or the body, so that the hydrocarbon supplied from an outside can be guided to flow vortically by the discharge tube or an inner wall of the body and mixed and reacted with the carbon dioxide, the carbon dioxide plasma and the methane while being introduced into the reaction space.

7. The plasma dry reforming apparatus according to claim 6, wherein the hydrocarbon supplying tube is inclined downward at a predetermined angle to a horizontal center line of the discharge tube or the body so that the hydrocarbon can be injected into the reaction space while flowing downwardly and vortically.

8. The plasma dry reforming apparatus according to claim 1, wherein the hydrocarbon supplied to the hydrocarbon supplying tube comprises methane.

9. The plasma dry reforming apparatus according to claim 1, wherein the hydrocarbon supplied to the hydrocarbon supplying tube comprises one of ethane, propane, ethylene and butane of a gas state; DME, gasoline, diesel, kerosene, bunker-C oil, and refined waste oil of a liquid state; or coal and biomass of a solid state.

10. The plasma dry reforming apparatus according to claim 9, wherein the hydrocarbon supplying tube injects a mixture of the hydrocarbon and the methane into the reaction space.

11. The plasma dry reforming apparatus according to claim 1, wherein the carbon dioxide supplying tube injects mixture gas of the carbon dioxide and the methane into the reaction space.

12. The plasma dry reforming apparatus according to claim 1, wherein the carbon dioxide supplying tube injects a mixture of the carbon dioxide and air or the carbon dioxide and steam into the reaction space, and a supplying tube is separately formed on a circumference of the discharge tube or the body and is adapted to inject air or steam into the reaction space.

13. The plasma dry reforming apparatus according to claim 1, further comprising: a $CO_2$ absorption process portion arranged to connect to the plasma reformer, receiving the produced synthetic gas from the plasma reformer, and absorbing carbon dioxide contained in the synthetic gas.

14. The plasma dry reforming apparatus according to claim 13, wherein the $CO_2$ absorption process portion feeds back and supplies the absorbed carbon dioxide to a carbon dioxide supplying route of the plasma reformer through a feedback line connected to the plasma reformer.

15. The plasma dry reforming apparatus according to claim 13, further comprising: a dimethyl ether (DME) production process portion arranged in a rear side of the $CO_2$ absorption process portion, receiving the synthetic gas, from which carbon dioxide is removed, and using hydrogen and carbon monoxide of the received synthetic gas to synthesize dimethyl ether.

16. The plasma dry reforming apparatus according to claim 13, further comprising: a cryogenic distillation column arranged in a rear side of the $CO_2$ absorption process portion, receiving the synthetic gas, from which carbon dioxide is removed, and dissociating hydrogen and carbon monoxide of the received synthetic gas from each other.

17. The plasma dry reforming apparatus according to claim 13, further comprising: a power generation portion arranged in a rear side of the $CO_2$ absorption process portion, receiving the synthetic gas, from which carbon dioxide is removed, and using the received synthetic gas as fuel to generate electricity.

18. The plasma dry reforming apparatus according to claim 17, wherein the power generation portion comprises one electricity generator among a gas engine, a gas turbine, a steam turbine and a fuel cell.

\* \* \* \* \*